US008136600B2

(12) United States Patent
Fowler et al.

(10) Patent No.: US 8,136,600 B2
(45) Date of Patent: Mar. 20, 2012

(54) VERTICAL ANNULAR SEPARATION AND PUMPING SYSTEM WITH INTEGRATED PUMP SHROUD AND BAFFLE

(75) Inventors: Tracy A. Fowler, Sugar Land, TX (US); Brian J. Fielding, Luanda (AO)

(73) Assignee: ExxonMobil Upstream Research Company, Houston, TX (US)

( * ) Notice: Subject to any disclaimer, the term of this patent is extended or adjusted under 35 U.S.C. 154(b) by 695 days.

(21) Appl. No.: 11/922,808

(22) PCT Filed: May 2, 2006

(86) PCT No.: PCT/US2006/016702
§ 371 (c)(1),
(2), (4) Date: Feb. 25, 2009

(87) PCT Pub. No.: WO2007/021335
PCT Pub. Date: Feb. 22, 2007

(65) Prior Publication Data
US 2009/0211763 A1 Aug. 27, 2009

Related U.S. Application Data

(60) Provisional application No. 60/706,740, filed on Aug. 9, 2005.

(51) Int. Cl.
*E21B 43/38* (2006.01)
*E21B 43/36* (2006.01)
*E21B 43/01* (2006.01)
*E21B 33/037* (2006.01)
(52) U.S. Cl. .................. 166/357; 166/367; 166/267

(58) Field of Classification Search .................. 166/357, 166/367, 265, 105.5; 417/413, 423.3, 424.2
See application file for complete search history.

(56) References Cited

U.S. PATENT DOCUMENTS

| 3,128,719 A | 4/1964 | Jongbloed et al. |
| 4,344,774 A | 8/1982 | Skipper |
| 4,481,020 A | 11/1984 | Lee et al. |
| 4,515,608 A | 5/1985 | Clegg |
| 4,793,418 A | 12/1988 | Wheeler et al. |
| 4,848,475 A | 7/1989 | Dean et al. |
| 4,900,433 A * | 2/1990 | Dean et al. ............... 210/170.11 |
| 4,981,175 A | 1/1991 | Powers |

(Continued)

FOREIGN PATENT DOCUMENTS
EP  0 711 903 B1  9/1999
(Continued)

OTHER PUBLICATIONS

PCT International Search Report and Written Opinion, Application No. PCT/US 06/16702 issued Feb. 5, 2007 for 2005UR028.

(Continued)

*Primary Examiner* — Thomas Beach
*Assistant Examiner* — James Sayre
(74) *Attorney, Agent, or Firm* — ExxonMobil Upstream Research Company-Law Department (57) ABSTRACT

A Vertical Annular Separation and Pumping System (VASPS) utilizing an isolation baffle to replace a standard pump shroud associated with an electrical submersible pump. The isolation baffle may be a one piece plate positioned so as to direct produced wellbore liquids around the electrical submersible pump motor to provide a cooling medium to prevent overheating and early failure of the electrical submersible pump.

23 Claims, 6 Drawing Sheets

U.S. PATENT DOCUMENTS

| | | | |
|---|---|---|---|
| 4,982,794 | A | 1/1991 | Houot |
| 5,133,407 | A | 7/1992 | Deines et al. |
| 5,389,128 | A | 2/1995 | Lopes |
| 5,462,585 | A | 10/1995 | Niskanen et al. |
| 5,474,601 | A | 12/1995 | Choi |
| 5,531,811 | A | 7/1996 | Kloberdanz |
| 5,570,744 | A | 11/1996 | Weingarten et al. |
| 5,902,378 | A | 5/1999 | Obrejanu |
| 6,035,934 | A | 3/2000 | Stevenson et al. |
| 6,036,749 | A | 3/2000 | Ribeiro et al. |
| 6,039,116 | A | 3/2000 | Stevenson et al. |
| 6,068,053 | A | 5/2000 | Shaw |
| 6,080,312 | A | 6/2000 | Bowers et al. |
| 6,082,452 | A | 7/2000 | Shaw et al. |
| 6,089,317 | A | 7/2000 | Shaw |
| 6,131,655 | A | 10/2000 | Shaw |
| 6,216,799 | B1 | 4/2001 | Gonzalez |
| 6,230,810 | B1 | 5/2001 | Rivas |
| 6,257,333 | B1 | 7/2001 | Mann et al. |
| 6,364,940 | B1 | 4/2002 | Prueter et al. |
| 6,367,547 | B1 | 4/2002 | Towers et al. |
| 6,394,182 | B1 | 5/2002 | Fadel |
| 6,481,499 | B2 | 11/2002 | Lopes |
| 6,564,865 | B1 | 5/2003 | Brady et al. |
| 6,651,745 | B1 | 11/2003 | Lush et al. |
| 6,723,158 | B2 | 4/2004 | Brown et al. |
| 7,152,682 | B2 | 12/2006 | Hopper |

FOREIGN PATENT DOCUMENTS

| | | |
|---|---|---|
| EP | 1 103 698 B1 | 5/2001 |
| GB | 895849 | 5/1962 |
| WO | WO 99/10070 | 3/1999 |
| WO | WO 01/88335 A1 | 11/2001 |
| WO | WO 03/100212 A1 | 12/2003 |

OTHER PUBLICATIONS

European Search Report No. 113085 issued Feb. 6, 2006 for 2005UR028.

Bybee, Karen. "Vertical Annular Separation and Pumping System." *Journal of Petroleum Technology*, vol. 54, No. 10 (Oct. 2002): pp. 44-45, 72.

Villa, M., et al. "Installation of the VASPS Subsea Gas-Liquid Separation and Pumping System in Marimba Field." Petroleum Abstracts No. 757319, 12th Annual Deep Offshore Technology International Conference, New Orleans, LA, (Nov. 7-9, 2000): pp. 1-19.

Henderson, C.P. "Downhole Separation Systems: The Ins and Outs of Downhole Separation." *Scandinavian Oil-Gas Magazine* No. 1/2 2000: pp. 11-14.

Villa, M. et al. "VASPS: An Innovative Subsea Separation System." Deep Offshore Technology, 11th Technology Conference and Exhibition, Stavanger, Norway, (Oct. 19-21, 1999): pp. 1-13.

Baker, A. C., et al. "The VASPS Subsea Separation and Pumping System Applied to Marginal Field Developments" SPE 23049, Offshore Europe Conference, Sep. 3-6, 1991, pp. 193-202, Aberdeen, Aberdeen City, UK.

Entress, J.H. et al. "The Current State of Development of the VASPS Subsea Separation and Pumping System" OTC 6768, 23rd Annual Offshore Technology Conference, May 6-9, 1991, pp. 627-635, Houston, Texas.

Baker, A. C., et al. "Application of Subsea Separation and Pumping to Marginal and Deepwater Field Developments" SPE 20698, 65th Annual Technical Conference and Exhibition of the Society of Petroleum Engineers, Sep. 23-26, 1990, pp. 783-789, New Orleans, LA.

Gregory, J., 1989. VASPS sends Subsea separation on downward spiral to success. *Offshore Engineer*, vol. 24, pp. 35-36.

Lea, J. F. et al. "What's new in artificial lift." *World Oil Magazine* Apr. 2004: vol. 22, No. 4. WorldOil.com. Jun. 16, 2004 <http://www.worldoil.com/magazine/MAGAZINE_DETAIL.asp?ART_ID=2256&MONTH_Year=Apr-2004>.

Do Vale, O.R., et al "VASPS Installation and Operation at Campos Basin", OTC 14003; The 2002 Offshore Technology Conference, 2002, pp. 1-13, XP 002364428.

\* cited by examiner

VERTICAL ANNULAR SEPARATION AND PUMPING SYSTEM WITH INTEGRATED PUMP SHROUD AND BAFFLE

CROSS REFERENCE TO RELATED APPLICATIONS

This application is the National Stage of International Application No. PCT/US06/016702, which claims the benefit of U.S. Provisional Application No. 60/706,740, filed 9 Aug. 2005. This application is related to International Application No. PCT/US06/017136 entitled "Vertical Annular Separation and Pumping System With Our Annulus Liquid Discharge Arrangement", which claims the benefit of U.S. Provisional Application No. 60/706,799 filed on 9 Aug. 2005.

FIELD OF THE INVENTION

This invention relates to a vertical annular separator for separating a fluid stream into a liquid phase stream and a gas phase stream. In particular, this invention relates to an apparatus for and methods of separating produced hydrocarbon fluids and other wellbore fluids into liquid and gas phase streams at subsea locations and directing the separated phase streams to other locations.

BACKGROUND OF THE INVENTION

Offshore hydrocarbon deposits continue to attraction significant attention from oil and gas producers throughout the world. As onshore hydrocarbon deposits currently in production, particularly in the United States, are depleted and as larger onshore oilfields are discovered only infrequently, producers increasingly look for new exploration and production opportunities in offshore subsea locations.

A factor limiting the development of many of the discovered offshore hydrocarbon deposits, particularly crude oil, natural gas, and associated natural gas liquids, is the cost to install and maintain equipment and facilities to produce the hydrocarbons. Offshore drilling and production platforms and subsea production equipment installations require sizeable investments. In trying to maximize the economic benefits from offshore facilities, producers focus on reducing the installation weight and cost of the equipment on the offshore production platforms necessary to produce the hydrocarbons.

By reducing the installation weight and cost of equipment, new offshore installations may be smaller and less expensive for producing newly discovered fields. Additionally, existing offshore installations may be further modified to handle production from more wells and larger production areas. By using existing facilities, a production facility may exploit marginal reservoirs adjacent to or near existing fields. Also, by using existing facilities to produce new or marginal discoveries, an oil producer can extend the life of the facilities and increase the level of recoverable reserves at costs less than those required for new discoveries and new installations. Often such new or marginal discoveries may be located at a remote location, e.g. 5 to 15 miles (8 to 24 km), from existing production platforms or facilities. Large, lengthy flowlines are installed to transport produced wellbore fluids, primarily crude oil, natural gas, natural gas liquids, and water, to these platforms or facilities from such a remote location.

Although large, lengthy flowlines are significantly less expensive than new offshore production platforms, such flowlines may limit the fluid production rate from a given well or collection of wells. One of the more significant factors limiting the amount of fluid a given oil or gas well may produce is the amount of back pressure exerted at the wellhead by facilities downstream of the wellhead. One measure of the amount of such back pressure is referred to as the wellhead flowing pressure. The wellhead flowing pressure is typically the pressure at the wellhead during normal operating conditions without a wellhead choke or other flow restriction means in the wellhead. When the wellhead flowing pressure can be reduced, a typical well can produce more fluid from a given reservoir, which leads to a longer field production life and more oil and gas recovery.

Several factors can cause increases in wellhead flowing pressure in a given well. For example, flowlines from subsea wellheads to separation facilities may in some cases be several miles long, which can result in significant friction losses, caused by turbulent, multiphase fluid flow in the flowlines. Such friction losses result in an increase in pressure required to move a given amount of fluid through a flowline. This pressure increase, when added to the operating pressures of facilities downstream of the wellhead, may significantly increase the wellhead flowing pressure. Another factor that causes increases in wellhead flowing pressure are changes in elevation from deepwater subsea fields to shallow water facilities. (Such change in elevation causes an increased fluid head, i.e. a column of fluid, in a flowline which increases the wellhead flowing pressure and significantly reduces fluid production.) Still another factor that may increase the wellhead flowing pressure is the gas-liquid (two-phase) flow regime in the flowline to the production platform. Such two-phase flow results in increased pressure losses compared to single phase flow in a flowline, such as where gases are produced through one flowline and liquids (oil and water) are produced through another flowline. A separate, but related, problem may occur in a two-phase flow when large volumes of liquids accumulate in a flowline and upon accumulation of adequate pressure, are pushed forward and produced in a very short period of time as large slugs of liquids. Liquids produced during a slugging event can overwhelm the fluid handling capabilities of equipment employed on an offshore platform or facility as well as create high back pressures on a well.

Several efforts have been proposed and implemented to reduce the wellhead flowing pressure by separating produced wellbore fluids into gas and liquid streams at a subsea location and then providing separate flowlines to the platform or facilities for both the gas and liquid phase streams. One particularly innovative approach to separating wellbore fluids into gas and liquid phase streams at a subsea location is the vertical annular separation and pumping system (VASPS), as disclosed in U.S. Pat. No. 4,900,433, entitled "Vertical Oil Separator", assigned to The British Petroleum Company. U.S. Pat. No. 4,900,433 is hereby incorporated by reference in its entirety. A more detailed description of a VASPS is provided in "VASPS: An Innovative Subsea Separation System" presented at the 11th International Conference and Exhibition, Oct. 19-21, 1999 at Stavanger, Norway, which presentation is hereby incorporated by reference in its entirety. A VASPS unit is frequently used as part of a subsea multiphase boosting system and artificial lifting method to increase reservoir production rates.

A VASPS is a two-phase (gas-liquid) separation and pumping system which may be installed in a subsea "dummy well" near the mudline of the subsea floor. A "dummy well" is a simple borehole, typically lined with a casing or similar pipe structure, extending into the subsea surface near the mudline a distance adequate to receive the VASPS. VASPS receives a full wellbore fluid stream and separates the stream into a gas phase stream and a liquid phase stream. The gas phase stream is then directed to a flowline and transported to other facilities for additional treating, while the liquid phase stream is pumped from the VASPS through a separate flowline to other treating facilities. Such subsea separation provides several benefits, including primary gas phase-liquid phase separation at a subsea location, which reduces the need for large, weighty separators on the offshore platforms to handle a gas-liquid flow regime. Also, such an arrangement lessens "slugging" effects associated with such gas-liquid two-phase flow by providing a constant fluid flow rate to the offshore production platform.

A typical VASPS unit may be a self-contained unit which includes an outer pressure housing, an inner helix separator assembly, a gas discharge annulus, a liquid discharge tube, a liquid discharge pump, and an electric motor to drive the liquid discharge pump. The entire VASPS unit would then be placed in an outer casing that may be cemented in the dummy well in the seabed. Alternatively, a VASPS unit may be placed in an outer housing mounted in a support placed on or near the subsea mudline.

During operation of a VASPS unit, a multiphase well stream (typically consisting of crude oil, natural gas, natural gas liquids, and salt water) enters the outer pressure housing and is directed to the inner helix separator for primary separation of the gas and liquid phase streams. This primary separation is accomplished through the application of centrifugal forces created by the cylindrical shape of the helix. Separated gas flows toward the center of the VASPS unit into a gas discharge annulus and up into a gas expansion chamber. The gas then exits the VASPS unit into a separate flowline for delivery to and further treatment at the production facility (typically the offshore platform). Meanwhile, the degassed liquid flows in a counter-current direction from the exiting gas down the helix separator into a liquid sump area where it is pumped by the liquid discharge pump through the liquid discharge tube into a separate flowline for delivery to and further treatment at the production facility (again typically the offshore platform).

Two of the key components for the removal of produced liquids from a VASPS unit are the electric motor and the liquid discharge pump. The electric motor is frequently combined with the liquid discharge pump to form an integrated unit referred to as an "electrical submersible pump" (ESP). ESPs are typically controlled and powered through an umbilical cord in communication with a remote control system and power source. The ESP discharges the produced, separated liquids through the liquid discharge tubing.

ESPs have long been used to produce liquid from wellbores, typically from formations having little or no produced gas. ESPs generally have difficulty (and are not particularly effective) in pumping fluids with significant volumes of free gas. This difficulty occurs because the centrifugal impellers of an ESP are typically designed for pumping fluids rather than compressing gas. Hence, with gases separated from wellbore fluids in a VASPS unit, an ESP can operate more effectively and efficiently to remove liquids. ESPs are supplied by various oilfield equipment suppliers, including Schlumberger with its REDA® line of ESPs and Baker Hughes with its Centrilift® line of ESPs. In many installations, ESPs are positioned in wellbores so that the electric motor is mounted below the pump (including the pump intake and discharge outlet). In a typical installation in a vertical or near vertical well, an ESP is set below the well perforations to maximize liquid draw down and to minimize gas introduction into and interference with the pump.

During operation, an ESP's electric motor can produce significant amounts of heat. As ESPs have no separate, dedicated cooling system to remove heat generated during normal operations, ESPs are designed to use wellbore fluids as a cooling medium to keep the pump and the electric motor from overheating. In many ESP arrangements, the pump is mounted above the electrical motor. In such arrangements, a device referred to as a pump shroud is sometimes used to direct the wellbore fluids around the electric motor during operation and to remove heat generated during pump operation. Without such a pump shroud or other fluid directing device, wellbore fluid would not move past the electrical motor and therefore not remove any significant heat generated by the electrical motor. A pump shroud typically covers and encloses the pump inlet above the top of the electric motor and may be 75 to 100 feet (25 to 30 meters) long. The wellbore liquid flows along the outside of the pump shroud to the bottom of the ESP. The liquid then makes a 180-degree turn at the bottom of the pump shroud and then flows upward between the inside of the pump shroud and the electric motor, removing heat generated by the electric motor as the wellbore fluid moves past the motor and into the pump. The pump shroud is typically retrieved when the ESP is removed from the wellbore.

In some wellbores with ESP installations, as well as in wellbores using a VASPS unit, installed pump shrouds may create numerous problems and limitations to the operations of the ESP. An improperly mounted or damaged pump shroud can create multiple problems, such as misdirected fluid flow. Such misdirected fluid flow can lead to electric motor overheating, which can in turn lead to excessive scale build-up between the electric motor and the pump shroud, which can further lead to reduced fluid production due to scale build-up. Additionally, misdirected fluid flow may cause poor gas separation due to pump shroud leakage, overheating of the electric pump causing shortened ESP run-times between repairs, and excessive pump shroud vibrations. Additionally, a pump shroud reduces the size of an ESP that can be placed in a given wellbore. If the pump shroud could be removed and replaced by a design that would provide the necessary wellbore fluid flow for adequate cooling of the ESP motor, larger ESPs, capable of moving more wellbore fluids, could be installed in a given opening. A more detailed description of a VASPS unit is provided below.

SUMMARY OF THE INVENTION

This invention provides an improved VASPS unit without the need for a separate pump shroud for redirecting fluid flow around the VASPS electric motor. Additionally, methods of operating a production facility using the improved VASPS to separate produced hydrocarbon fluids and other wellbore fluids into liquid and gas phase streams at subsea locations and directing the separated phase streams to other locations are also disclosed.

In particular, a subsea vertical separator of the present invention would include:
  (a) an intermediate casing within an outer casing, forming a first annulus;
  (b) an inner casing within the intermediate casing, forming a second annulus;
  (c) a fluid inlet in communication with the first annulus;
  (d) a gas outlet in communication with the second annulus;
  (e) a liquid passage in the inner casing for conducting separated liquid phase fluids, wherein the liquid passage has a liquid inlet and a liquid outlet;
  (f) a pump assembly comprising a pump positioned within the intermediate casing having (i) a pump intake and (ii) a pump discharge in fluid communication with the liquid inlet of the liquid passage;

(g) a motor positioned below the pump assembly to drive the pump; and (h) an isolation baffle positioned between the inner casing and intermediate casing at or above the pump assembly, whereby separated liquid phase fluids accumulating in the second annulus above the isolation baffle are directed primarily to pass (i) from the second annulus into the first annulus above the isolation baffle, (ii) back into the second annulus at a location below the isolation baffle and at or below the motor assembly, and (iii) into the pump intake above the motor assembly.

In any of the embodiments described, the subsea vertical separator could include a helix assembly positioned in the first annulus between the outer casing and the intermediate casing.

In any of the embodiments described, the subsea vertical separator could include (a) first passages in the intermediate casing above the isolation baffle to allow separated gas phase fluids to pass from the first annulus to the second annulus and to the gas outlet and (b) second passages in the intermediate casing at or below the motor to allow separated liquid phase fluids to pass from the first annulus to the second annulus and to the pump intake.

In any of the embodiments described, the subsea vertical separator could include an opening below the motor and below the bottom of the intermediate casing, thereby allowing separated liquid phase fluids to flow (i) from the first annulus, (ii) under the bottom of the intermediate casing to the second annulus, (iii) upward past the motor assembly, and (iv) upward to the pump intake.

In any of the embodiments described, the subsea vertical separator could have the isolation baffle attached (a) to the pump assembly with a means for flexibly sealing against the intermediate casing or (b) to the inner casing above the pump assembly with a means for flexibly sealing against the intermediate casing.

In an embodiment described, the subsea vertical separator could have the isolation baffle attached to the pump assembly and a landing ring attached to the intermediate casing allowing the landing ring to receive the isolation baffle and providing a substantial fluid seal against the intermediate casing.

In any of the embodiments described, the subsea vertical separator could include a landing guide attached to the pump assembly capable of guiding the pump assembly through the landing ring.

In an embodiment described, wherein the isolation baffle could be attached to the inner casing and a landing ring could be attached to the intermediate casing whereby the landing ring is capable of receiving the isolation baffle and providing a fluid seal against the intermediate casing.

In particular, a subsea vertical separator of the present invention would include:

(a) an intermediate casing within an outer casing, forming a first annulus;

(b) a helix assembly positioned in the first annulus between the outer casing and the intermediate casing;

(c) an inner casing within the intermediate casing, forming a second annulus;

(d) a fluid inlet in communication with the first annulus;

(e) a gas outlet in communication with the second annulus;

(f) a liquid passage in the inner casing for conducting separated liquid phase fluids, wherein the liquid passage has a liquid inlet and a liquid outlet;

(g) a pump assembly comprising a pump positioned within the intermediate casing having (i) a pump intake and (ii) a pump discharge in fluid communication with the liquid inlet of the liquid passage;

(h) a motor positioned below the pump assembly to drive the pump;

(i) an isolation baffle positioned between the inner casing and intermediate casing at or above the pump assembly, whereby separated liquid phase fluids accumulating in the second annulus above the isolation baffle are directed primarily to pass (i) from the second annulus into the first annulus above the isolation baffle, (ii) back into the second annulus at a location below the isolation baffle and at or below the motor assembly, (iii) into the pump intake above the motor assembly, (iv) through the pump, (v) through the liquid inlet of the liquid passage, (vi) through the liquid passage, and (vii) finally through the liquid outlet of the liquid passage;

(j) first passages in the intermediate casing above the isolation baffle to allow separated gas phase fluids to pass from the first annulus to the second annulus and to the gas outlet; and (k) second passages in the intermediate casing at or below the motor to allow separated liquid phase fluids to pass from the first annulus to the second annulus and to the pump intake.

In particular, a method for producing hydrocarbons from a subsea location of the present invention would include:

(a) providing a production facility;

(b) installing a subsea vertical separator capable of separating produced wellbore fluids into a liquid phase and a gas phase, such separator comprising:

(i) an intermediate casing within an outer casing, forming a first annulus;

(ii) an inner casing within the intermediate casing, forming a second annulus;

(iii) a fluid inlet in communication with the first annulus;

(iv) a gas outlet in communication with the second annulus;

(v) a liquid passage in the inner casing for conducting separated liquid phase fluids, wherein the liquid passage has a liquid inlet and a liquid outlet;

(vi) a pump assembly comprising a pump positioned within the intermediate casing having (a) a pump intake and (b) a pump discharge in fluid communication with the liquid inlet of the liquid passage;

(vii) a motor assembly positioned below the pump assembly to drive the pump; and (viii) an isolation baffle positioned between the inner casing and intermediate casing at or above the pump assembly, whereby separated liquid phase fluids accumulating in the second annulus above the isolation baffle are directed primarily to pass (a) from the second annulus into the first annulus above the isolation baffle, (b) back into the second annulus at a location below the isolation baffle and at or below the motor assembly, and (c) into the pump intake above the motor assembly;

(c) installing a piping system to transport separated gas to the production facility;

(d) installing a piping system to transport separated liquids to the production facility;

(e) connecting a power source and a control source to the motor assembly;

(f) producing wellbore fluids from the subsea location;

(g) transporting the produced wellbore fluids to the separator fluid inlet;

(h) separating the produced wellbore fluids into a gas phase and a liquid phase;

(i) transporting the gas phase fluids to the production facility; and (j) transporting the liquid phase fluids to the production facility.

BRIEF DESCRIPTION OF THE DRAWINGS

Examples of the prior art and various embodiments of this invention are shown in the attached Figures, wherein.

DETAILED DESCRIPTION OF THE INVENTION

The present invention provides a VASPS unit without a separate pump shroud to circulate wellbore fluids for use as a cooling medium for the ESP electric motor on the VASPS unit. In one embodiment, an isolation baffle is mounted to an ESP assembly and positioned to allow wellbore fluids to circulate around an intermediate casing below the ESP electric motor prior to entering the ESP pump intake.

In another embodiment, an isolation baffle is mounted to an inner fluid discharge tubing and positioned to direct wellbore fluids to circulate around the intermediate casing below the ESP electric motor prior to entering the ESP pump intake.

In another embodiment, an isolation baffle is mounted to an ESP assembly and a landing ring is installed against an intermediate casing to receive the isolation baffle to direct wellbore fluids to circulate around the intermediate casing below the ESP electric motor prior to entering the ESP pump intake.

In another embodiment, an isolation baffle is mounted to an inner fluid discharge tubing and a landing ring is installed against an intermediate casing to receive the isolation baffle to direct wellbore fluids to circulate around the intermediate casing below the ESP electric motor prior to entering the ESP pump intake.

In another embodiment, a flexible seal is mounted to an ESP assembly and a sealing bushing is installed against an intermediate casing to receive the flexible seal to direct wellbore fluids to circulate around the intermediate casing below the ESP electric motor prior to entering the ESP pump intake.

In another embodiment, an isolation baffle with a exterior flexible seal is mounted to an inner fluid discharge tubing and a sealing bushing is installed against an intermediate casing to receive the exterior flexible seal to direct wellbore fluids to circulate around the intermediate casing below the ESP electric motor prior to entering the ESP pump intake.

Apparatus Description

A prior art VASPS unit and the improved VASPS units of the present invention will now be described with reference to the Figures.

Figure 1:
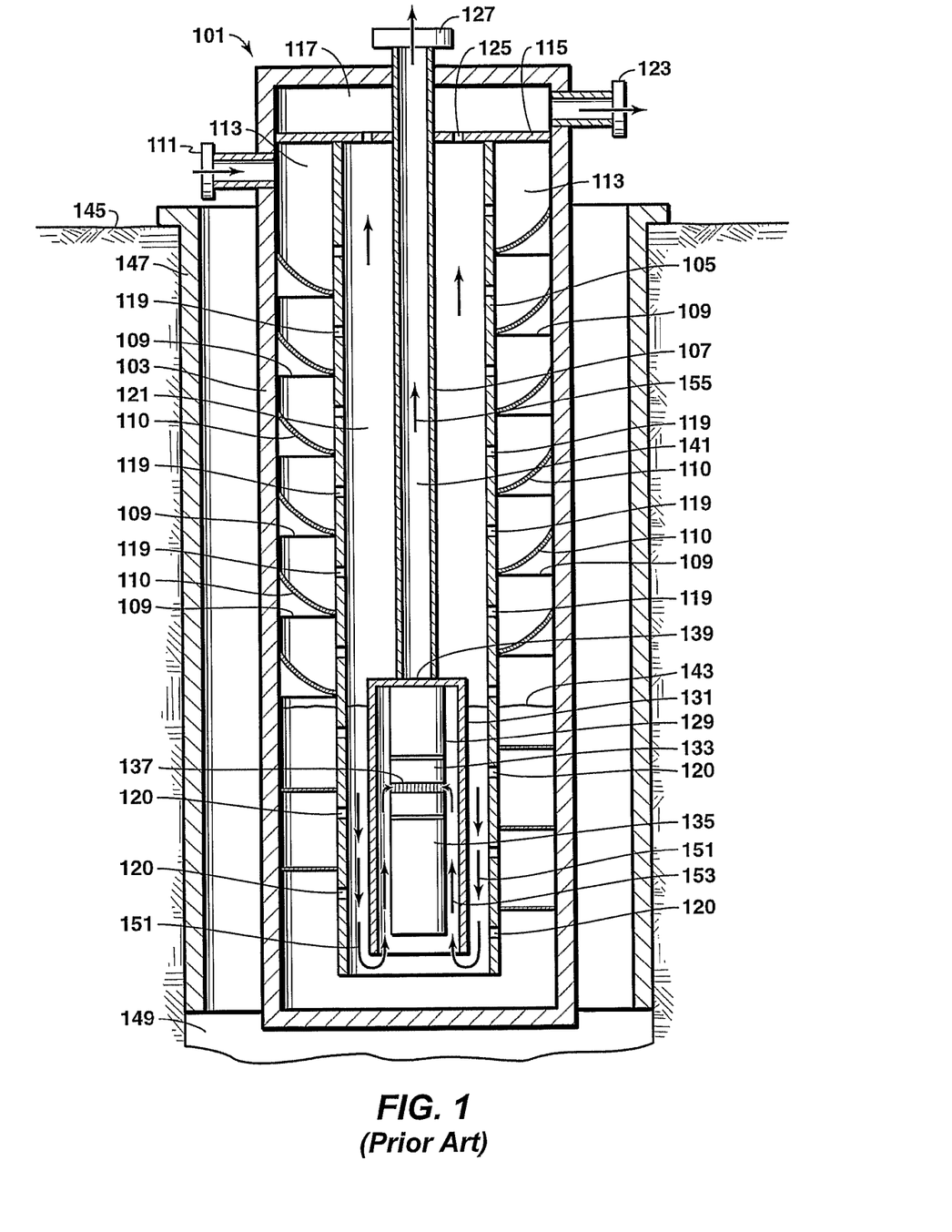
FIG. 1 is a sectional view of a prior art VASPS unit.

FIG. 1 shows a sectional view of a prior art VASPS unit 101. Prior art VASPS unit 101 comprises pressure housing 103 surrounding intermediate casing 105 surrounding inner casing 107, each typically in tubular form, constructed typically of standard size concentric oilfield pipe and casing materials. Typical sizes and materials of construction for these would include: (i) for pressure housing 103: 30 to 36 inch (0.8 to 1.0 meter) casing having an overall length of about 100 to 225 feet (30 to 70 meters); (ii) for intermediate casing 105: 16 to 26 inch (0.5 to 0.7 meter) pipe; and for inner casing 107: 8 to 10 inch (0.25 to 0.35 meter) screwed tubing.

Positioned between pressure housing 103 and intermediate casing 105 is helix assembly 109. Helix assembly 109 provides initial, primary separation of the produced fluids into a gas phase and a liquid phase. Helix assembly 109 may be constructed from a length of metal plate twisted, rolled, or pressed to form a cylindrical spiral shape around and preferably connected to intermediate casing 105. Helix assembly 109 preferably intersects intermediate casing 105 perpendicularly or nearly perpendicularly as helix assembly 109 spirals around intermediate casing 105. FIG. 1 shows a cross section of helix assembly 109 as it abuts perpendicularly to intermediate casing 105.

Fluid inlet 111 allows fluids to enter pressure housing 103 into fluid annulus 113 formed between the inner wall of pressure housing 103 and the outer wall of intermediate casing 105. Plate 115 is located at the top of intermediate casing 105 and isolates separator head-space 117 from fluid annulus 113. Gas passages 119 extending through intermediate casing 105 allow for fluid (primarily gas) communication between fluid annulus 113 and gas annulus 121 formed between the inner wall of intermediate casing 105 and the outer wall of inner casing 107. Liquid passages 120 extending through intermediate casing 105 allow for fluid (primarily liquid) communication between fluid annulus 113 near the lower end of intermediate casing 105 during operation of VASPS unit 101. Gas passages 125 extending through plate 115 allow fluid (primarily gas) communication between gas annulus 121 and separator head-space 117. Gas outlet 123 extends through pressure housing 103 to allow fluid (primarily gas) communication between separator head-space 117 and gas outlet flowline (not shown).

Inner casing 107 extends from liquid outlet 127 down through separator head-space 117 to ESP assembly 129. ESP assembly 129 comprises pump shroud 131, ESP pump 133, and ESP motor 135. Pump shroud 131 may extend to above, at, or below the bottom of intermediate casing 105. ESP intake 137 communicates through ESP pump 133 into ESP discharge connection 139 into liquid passage 141 of inner casing 107 for discharge through liquid outlet 127.

Prior art VASPS 101 is typically installed at a subsurface location at or above the mudline of subsea bed 145 and placed in base conduit 147 which is cemented in place in a dummy hole 149.

A wide selection of materials are available for constructing VASPS 101. Those reasonably skilled in the art of subsea production equipment are aware of material and equipment performance requirements for subsea equipment. Such individuals reasonably skilled in the art will consider factors such as operating temperatures and pressures, projected fluid production volumes, gas-liquid ratios, produced fluid quality, i.e. considering contaminants such as carbon dioxide and hydrogen sulfide, and other factors in selecting the materials to construct VASPS 101. It is expected that most components of VASPS 101 are commercially available or easily fabricated from standard oil field equipment.

The operation of prior art VASPS 101 will now be discussed with reference to FIG. 1. Produced two-phase (liquid and gas) wellbore fluids enter prior art VASPS 101 through fluid inlet 111. The wellbore fluids enter fluid annulus 113 and are routed through helix assembly 109 where they experience angular acceleration. The wellbore liquid stream (typically crude oil and water), being more dense that the wellbore gas (typically natural gas), will move to the inside edge of pressure housing 103 and begin moving downward under gravitational forces toward the bottom of pressure housing 103. As the gas and fluid streams begin to separate and the separated gas stream moves toward the outer wall of intermediate casing 105, gas-liquid interface 110 will form on top of helix assembly 109 and against the inner wall of pressure housing 103. The less dense wellbore gas stream will move toward the center of intermediate casing 105 and into gas annulus 121 through gas passages 119. The gas will then move up gas annulus 121 through gas passages 125 into separator head-space 117. The separated gas will then move out of prior art VASPS 101 through gas outlet 123 and into a gas outlet flowline (not shown) for further treating and handling.

As the produced liquids move to the inside wall of pressure housing 103 and move downward under gravitational force, liquid accumulation occurs at the bottom of the prior art VASPS 101 so as to establish a liquid height 143. The separated liquid may accumulate around ESP assembly 129 from fluid annulus 113 through liquid passages 120.

When liquid height 143 reaches a predetermined level, ESP motor 135 is energized to drive ESP pump 133. The monitoring of liquid height 143 and the control of ESP pump 133 are well known in the art and may utilize liquid still-wells with ultrasonic level sensors and variable speed pump controllers to control and power ESP pump 133 to remove accumulated, produced fluid from VASPS 101.

The separated liquids (oil and water) flow downward between intermediate casing 105 and pump shroud 131 as shown by flow arrows 151. At the bottom of pump shroud 131, the produced liquid stream changes direction and then begins to flow upward past ESP motor 135 into ESP intake 137 as shown by flow arrows 153. By flowing around the pump shroud 131 and back past ESP motor 135, the produced wellbore liquids act as a cooling medium by removing heat from and generated by ESP motor 135.

The separated liquid stream then flows through ESP pump 133 through ESP discharge connection 139 and into liquid passage 141 in inner casing 107 and out of prior art VASPS 101 through liquid outlet 127 as shown by flow arrow 155.

VASPS of the prior art and current inventions may vary in size and capacity. ESP assembly 129 may include a ESP motor 135 having a 100 to 2000 horsepower rating and ESP pump 133 capable of moving 100 to 50,000 barrels of fluid a day at discharge pressures up to 3000 psi.

Figure 2A:
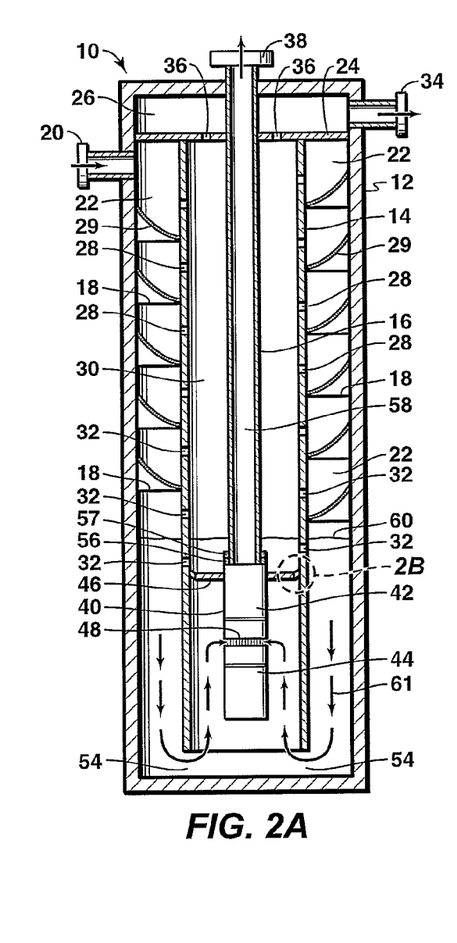
FIG. 2A is a sectional view of a VASPS unit according to the present invention showing an isolation baffle adjacent to the ESP pump assembly.

FIG. 2A shows a sectional view of the improved VASPS 10 of the present invention. VASPS 10 is comprised of outer casing pressure housing 12 surrounding intermediate casing 14 surrounding inner casing liquid discharge tubing 16. Pressure housing 12 and intermediate casing 14 may be constructed of any material, but are preferably constructed of standard oilfield tubulars such as casing materials or carbon steel pipe which are compatible with service conditions and requirements of a subsea facility. Likewise, liquid discharge tubing 16, may be constructed of any material, but is preferably constructed of standard, screwed oilfield tubulars which allow the easy placement and retrieval of portions of VASPS 10. The upper and lower ends (not labeled in the Figures) of pressure housing 12 may be plates or other means to provide overall pressure containment for the operation of VASPS 10, particularly pressure housing 12, and each of the embodiments described herein. These plates or other means may be welded to or otherwise fixedly attached to pressure housing 12. Also, the upper and lower ends might be connected to pressure housing 12 by use of removable connections to provide for the removal and repair or replacement of VASPS 10.

Positioned between pressure housing 12 and intermediate casing 14 is helix assembly 18. Helix assembly 18 may be a series of vanes or plates, preferably welded on to the outer wall of intermediate casing 14, that form a spiral conduit which contacts the inner wall of pressure housing 12. Wellbore fluids enter pressure housing 12 through fluid inlet 20 into fluid annulus 22 which is formed by the inner wall of pressure housing 12 and the outer wall of intermediate casing 14. Plate 24 is located at the top of intermediate casing 14 and extends to inner wall of pressure housing 12 and isolates separator head-space 26 from fluid annulus 22. Gas passages 28 extend through intermediate casing 14 and allow for fluid (primarily gas) communication between fluid annulus 22 and gas annulus 30 which is formed by the inner wall of intermediate casing 14 and the outer wall of liquid discharge tubing 16. Lower passages 32 extending through intermediate casing 14 allow fluid (primarily liquid) communication between gas annulus 30 and fluid annulus 22 near the lower end of intermediate casing 14. Gas outlet 34 extends through pressure housing 12 to allow fluid (primarily gas) communication between separator head-space 26 and gas outlet flowline (not shown). Gas passages 36 in plate 24 allow fluid (primarily gas) communication between gas annulus 30 and separator head-space 26. It is preferred that fluid inlet 20, gas outlet 34, and liquid outlet 38 be at or near the top of VASPS 10.

It should also be understood that the Figures herein do not show any removable connector means which might be used to secure and position the internal parts of VASPS 10 while providing for the removal for repair or replacement of VASPS 10. For example, no removable connector means are shown to secure helix assembly 18 to intermediate casing 14 or to secure intermediate casing 14 to pressure housing 12. Such connectors are considered standard equipment and well understood by individuals familiar with subsea oilfield production equipment and may be selected from commercially available subsea connector equipment.

Figure 2B:
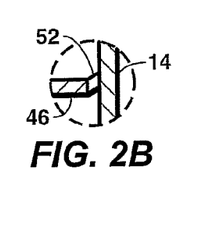
FIG. 2B is a detail view of an isolation baffle according to the present invention.

Liquid discharge tubing 16 having liquid passage 58 extends from liquid outlet 38 down through separator head-space 26 to liquid passage inlet 57 and into ESP assembly 40 at ESP discharge connection 56. ESP assembly 40 comprises ESP pump 42, ESP motor 44, and isolation baffle 46. Isolation baffle 46 is attached in FIG. 2A to ESP assembly 40 above ESP intake 48 (the pump inlet ports) and contacts the inside wall of intermediate casing 14. Isolation baffle 46 will preferably be a circular disk with a flexible outer edge seal 52. Isolation baffle 46 should be fabricated from a material stiff enough to support and not deflect away from the inside wall of intermediate casing 14 under differential pressure to be encountered across isolation baffle 46 during operation of the ESP assembly 40. A preferred material for isolation baffle 46 and flexible outer edge seal 52 would be a neoprene or high density polyethylene material. It is not critical that flexible outer edge seal 52 form a leak proof seal against the inside wall of intermediate casing 14, but only necessary that the seal directs an adequate amount of fluid through lower liquid passage 54 to properly cool ESP motor 44. Additionally, isolation baffle 46 may be a circular, carbon steel metal plate with only outer edge 52 fabricated from a neoprene or high density polyethylene type material. A detail of isolation baffle 46 and outer edge 52 is shown in FIG. 2B.

The bottom of intermediate casing 14 should preferably extend to or below the bottom of ESP assembly 40 and most preferably below ESP motor 44. ESP intake 48 communicates with fluid annulus 22 through lower liquid passages 54 below the bottom of intermediate casing 14. ESP intake 48 is also in fluid communication with ESP pump 42 which moves liquid into ESP discharge connection 56 at liquid passage inlet 57 and into liquid passage 58 of liquid discharge tubing 16 for discharge through liquid outlet 38. Liquid phase flow 61 is noted by the arrows in FIG. 2A. Controls to operate ESP assembly 40 to discharge the separated liquids are not shown in FIG. 2A. The monitoring of liquid level and the control of ESP assembly 40 are well known in the art and may utilize liquid still-wells with ultrasonic level sensors and variable speed pump controllers to control and power ESP assembly 40 to remove accumulated, produced fluid from VASPS 10.

Not shown in FIG. 2A is the placement of VASPS 10 on the subsea floor. VASPS 10 is preferably installed at a location at or above the mudline of subsea bed (not shown) and placed in base conduit (not shown) which is cemented in place in a dummy hole. However, depending on the application and location of associated subsea facilities, VASPS 10 may be installed in a base conduit extending partially into the seabed. It is also possible to have VASPS 10 resting on the seabed or even above the seabed when integrated with other production equipment.

The operation of VASPS 10 will now be discussed with reference to FIGS. 2A and 2B. Produced two-phase (liquid and gas) wellbore fluids enter VASPS 10 through fluid inlet 20. The wellbore fluids enter fluid annulus 22 where they experience angular acceleration caused by helix assembly 18. The wellbore liquids (typically crude oil and water), being more dense that the wellbore gas (typically natural gas), will move to the inside edge of pressure housing 12 and begin moving under gravitational forces toward the bottom of pressure housing 12. The less dense wellbore gas will move toward the center of intermediate casing 14 and into gas annulus 30 through gas passages 28. Gas-liquid interface 29 is formed on the upper side of helix assembly 18. The gas will then move up gas annulus 30 through gas passages 36 into separator head-space 26. The separated gas will expand and then move out of VASPS 10 through gas outlet 34 and a gas outlet flowline (not shown) to other treating and handling facilities.

As the produced liquids move to the inside edge of pressure housing 12 and move downward under gravitational forces, separated liquids accumulate at the bottom of VASPS 10 so as to establish a liquid height 60. The separated liquid may accumulate around ESP assembly 40 by moving from fluid annulus 22 through lower liquid passages 54.

When liquid height 60 reaches a predetermined level, ESP motor 44 is energized to drive ESP pump 42. The separated liquids (oil and water) flow downward between pressure housing 12 and intermediate casing 14 as shown by flow arrows 61. At the bottom of intermediate casing 14, the produced liquid changes direction and then begins to flow upward past ESP motor 44 into ESP intake 48. By flowing around the intermediate casing 14 and through lower liquid passages 54 and then back past ESP motor 44, the produced wellbore fluids act as a cooling medium by removing heat from and generated by ESP motor 44 and assist in maintaining an acceptable operating temperature for ESP motor 44.

The produced liquids then move through ESP pump 42 and out ESP discharge connection 56 through liquid passage inlet 57 into liquid passage 58 in liquid discharge tubing 16. The produced fluids then exit VASPS 10 through liquid outlet 38 to a liquid discharge line (not shown) and to another facility (not shown) for further treating.

The most significant differences in the prior art VASPS 101 and the VASPS 10 of FIGS. 2A and 2B are (i) the removal of the pump shroud 131 (FIG. 1) and its replacement with isolation baffle 46 (FIG. 2A) and (ii) the removal of certain liquid flow passages 120 below the top of ESP assembly 129 (FIG. 1) and the ensuing redirection of liquid flow at the base of the VASPS 10. Additionally, lower passages 32 do not extend through intermediate casing 14 below isolation baffle 46. The removal of the pump shroud 131 (FIG. 1) provides many benefits, including reduced expenses associated with installing and maintaining the pump shroud and the ability to install a larger capacity ESP pump 42 to produce more fluid from a given VASPS unit without increasing the size of the pressure housing 12 or intermediate casing 14.

Figure 2C:
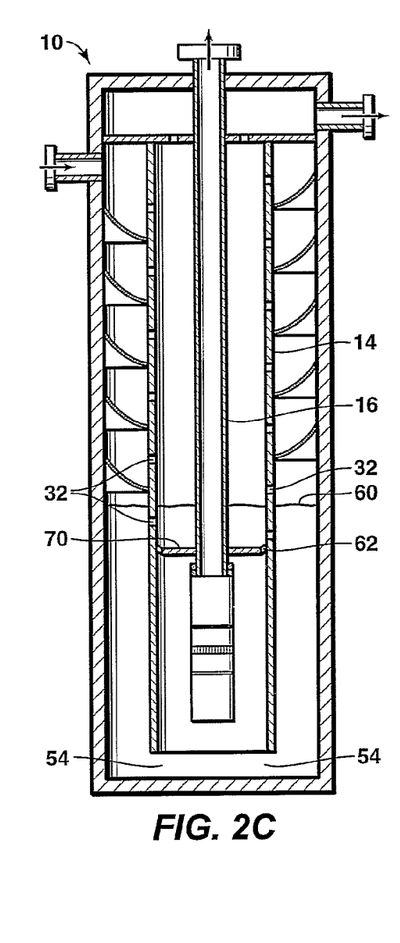
FIG. 2C is a sectional view of a VASPS unit according to the present invention showing an isolation baffle adjacent to the liquid discharge tubing.

FIG. 2C shows a sectional view of an another embodiment of VASPS 10 as modified from the embodiment shown in FIG. 2A. The only change in FIG. 2B from the embodiment shown in FIG. 2A is the location of the attachment of isolation baffle 70. Specifically, isolation baffle 70, with flexible outer edge seal 62, of the embodiment shown in FIG. 2C attaches to the outside wall of inner casing liquid discharge tubing 16 above ESP assembly 40. As with isolation baffle 46 in FIG. 2A, isolation baffle 70 will preferably be a circular disk with a flexible outer edge seal 62. Isolation baffle 70 should be fabricated from a material stiff enough to support and not deflect away from the inside wall of intermediate casing 14 under any differential pressure expected to be encountered across isolation baffle 70. A preferred material for isolation baffle 70 and flexible outer edge seal 62 would be a neoprene or high density polyethylene material. It is not critical that flexible outer edge seal 62 form a leak proof seal against the inside wall of intermediate casing 14, but only necessary that the seal directs an adequate amount of fluid through lower liquid passage 54 to properly cool ESP motor 44. Additionally, isolation baffle 70 may be a circular, carbon steel metal plate with only outer edge 62 fabricated from a neoprene or high density polyethylene type material For the embodiment shown in FIG. 2C, it is preferred that isolation baffle 70 is attached to the outside wall of liquid discharge tubing 16 whereby when installed in intermediate casing 14, isolation baffle 70 is positioned below the lowest lower passage 32 to prevent excessive movement of liquid from fluid annulus 22 (or gas annulus 30) directly to ESP intake 48 without first moving past ESP motor 44.

Figure 3A:
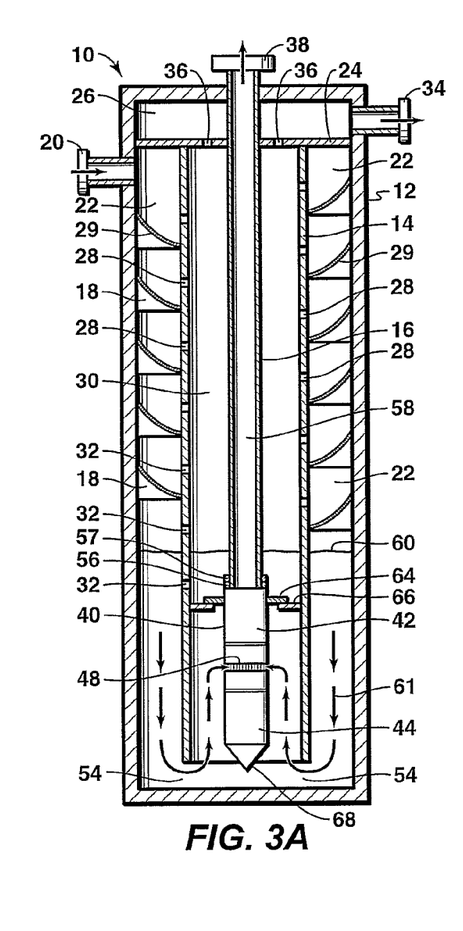
FIG. 3A is a sectional view of a VASPS unit according to the present invention showing an isolation baffle adjacent to the pump assembly with a landing ring to receive the isolation baffle.

FIG. 3A shows a sectional view of a further modification of VASPS 10 shown in FIG. 2A. The embodiment shown in FIG. 3A has a modified isolation baffle 64, which is again attached to ESP assembly 40, but has a diameter somewhat less than the inside diameter of intermediate casing 14. Attached to the inside of intermediate casing 14 is landing ring 66 which is positioned to contact and receive isolation baffle 64 when ESP assembly 40 is placed in VASPS 10. Landing ring 66 should have an inside diameter smaller than the outside diameter of isolation baffle 64. When isolation baffle 64 is engaged with landing ring 66, wellbore fluids will be directed around the bottom of intermediate casing 14 and up past ESP motor 44 and into ESP intake 48. As in the embodiments shown in FIGS. 2A and 2C, it is not necessary that a leak proof seal be formed by the isolation baffle 64 against landing ring 66, but only that excessive movement of liquid from fluid annulus 22 (or gas annulus 30) directly to ESP intake 48 without first moving past ESP motor 44 is prevented. An improved seal may be accomplished with a flexible insert (not shown) such as neoprene or high density polyethylene placed on the surface between the under surface of isolation baffle 64 and the upper surface of landing ring 66.

To assist in placing ESP assembly 40 through landing ring 66, alignment guide 68 may be attached to ESP assembly 40. Alignment guide 68 may be any simple metal or other material structure, preferably pointed or conical in shape, that prevents the bottom of ESP assembly 40 from engaging, and not moving past, landing ring 66 while inserting ESP assembly 40 during assembly or repair operations for VASPS 10.

Figure 3B:
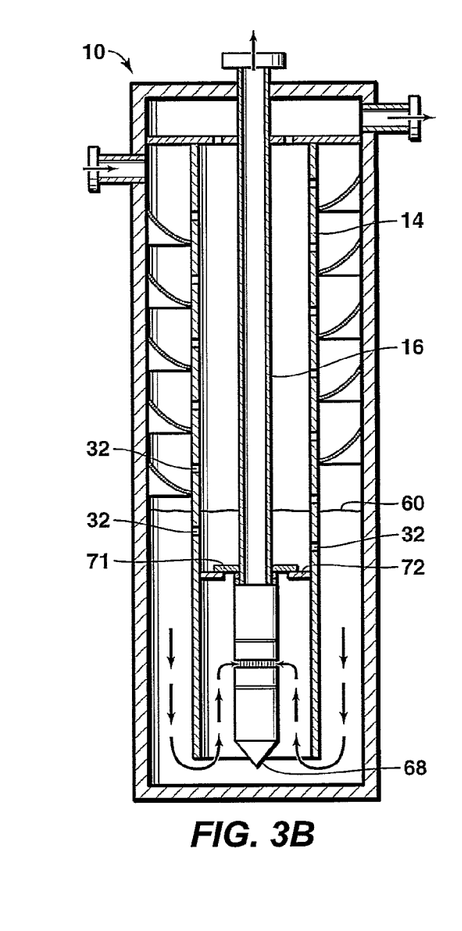
FIG. 3B is a sectional view of a VASPS unit according to the present invention showing an isolation baffle adjacent to the liquid discharge tubing with a landing ring to receive the isolation baffle.

FIG. 3B shows a sectional view of another embodiment of VASPS 10 as modified from the embodiment shown in FIG. 3A. In FIG. 3B, isolation baffle 71 attaches to the outside wall of inner casing liquid discharge tubing 16 above ESP assembly 40. Landing ring 72 is attached to the inside of intermediate casing 14. For the embodiment shown in FIG. 3B, it is preferred that isolation baffle 71 is attached to the outside wall of liquid discharge tubing 16 so that when installed in intermediate casing 14, isolation baffle 71 is positioned below the lowest lower passages 32 to prevent excessive movement of liquid from fluid annulus 22 directly to ESP intake 48 without moving past ESP motor 44. Additionally, the embodiment shown in FIG. 3B has alignment guide 68 to assist in placing ESP assembly 40 through landing ring 72.

Figure 4A:
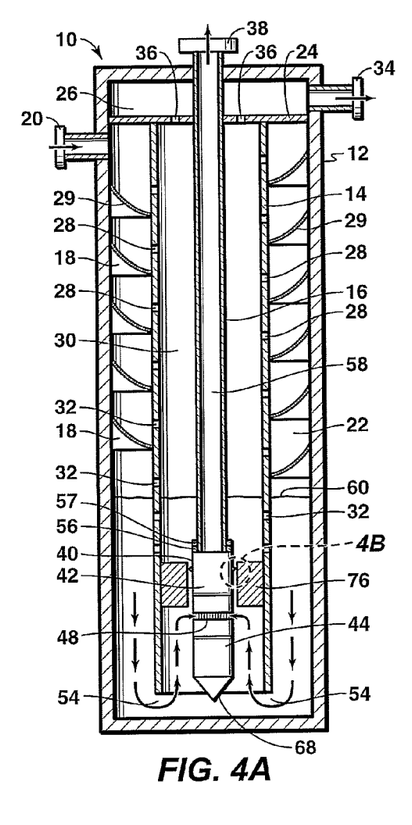
FIG. 4A is a sectional view of a VASPS unit according to the present invention showing a flexible seal adjacent to the pump assembly with a sealing bushing to receive the isolation baffle.
Figure 4B:
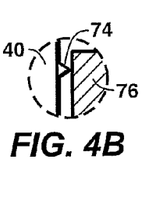
FIG. 4B is a detail view of a sealing bushing according to the present invention.

FIG. 4A shows a sectional view of another modification of VASPS 10 shown in FIG. 2A. The embodiment shown in FIG. 4A has flexible seal 74 attached preferably at or near the top of ESP assembly 40 that engages the inner wall of sealing bushing 76. A preferred material for flexible seal 74 would be a neoprene or high density polyethylene material. Additionally, sealing bushing 76 is attached to the inside of intermediate casing 14. For the embodiment shown in FIG. 4A, it is preferred that sealing bushing 76 be attached to the inside wall of intermediate casing 14 so that flexible seal 74 is positioned below the lowest lower passages 32 to prevent excessive movement of liquid from fluid annulus 22 directly to ESP intake 48 without moving past ESP motor 44. Sealing bushing 76 is similar to landing ring 66 of FIGS. 3A and 3B, but has a more cylindrical shape with a greater length to provide a long sealing surface for flexible seal 74 to engage the inner surface of sealing bushing 76 and fuller alignment of ESP assembly 40 in VASPS 10. As in the embodiments described herein, it is not necessary that a leak proof seal be formed by the flexible seal 74 against its seating location (sealing bushing 76), but only that excessive movement of liquid from above ESP assembly 40 directly to ESP intake 48 without moving past ESP motor 44. A detail of flexible seal 74 and sealing bushing 76 is shown in FIG. 4B.

Figure 4C:
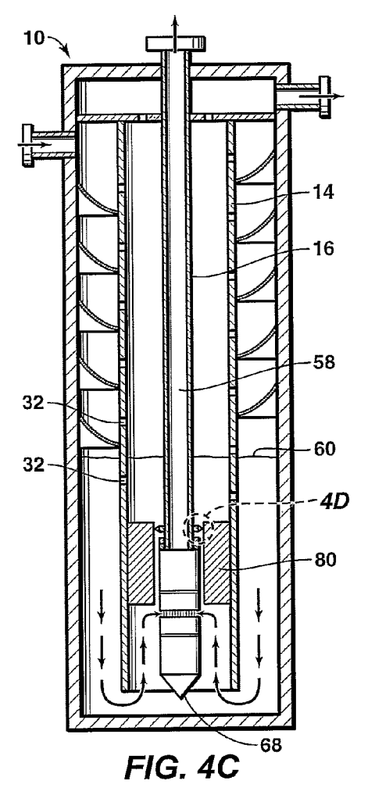
FIG. 4C is a sectional view of a VASPS unit according to the present invention showing a flexible seal adjacent to the liquid discharge tubing with a sealing bushing to receive the isolation baffle.
Figure 4D:
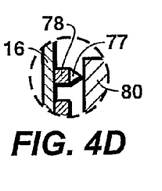
FIG. 4D is a detail view of a sealing bushing according to the present invention.

FIG. 4C shows a sectional view of an another embodiment of VASPS 10 as modified from the embodiment shown in FIG. 4A. In FIG. 4C, isolation baffle 78 attaches to the outside wall of inner casing liquid discharge tubing 16 above ESP assembly 40. At the edge of isolation baffle 78 is flexible seal 77 that engages the inner wall of sealing bushing 80. Sealing bushing 80 is attached to the inside of intermediate casing 14. For the embodiment shown in FIG. 4C, it is preferred that isolation baffle 78 be attached to the outside wall of intermediate casing liquid discharge tubing 16 so that when installed in intermediate casing 14, isolation baffle 78 is positioned below the lowest lower passages 32 to prevent excessive movement of liquid from fluid annulus 22 directly to ESP intake 48 without moving past ESP motor 44. Additionally, the embodiment shown in FIG. 4C has alignment guide 68 to assist in placing ESP assembly 40 through sealing bushing 80. A detail of flexible seal 77 and sealing bushing 80 is shown in FIG. 4D.

Figure 5:
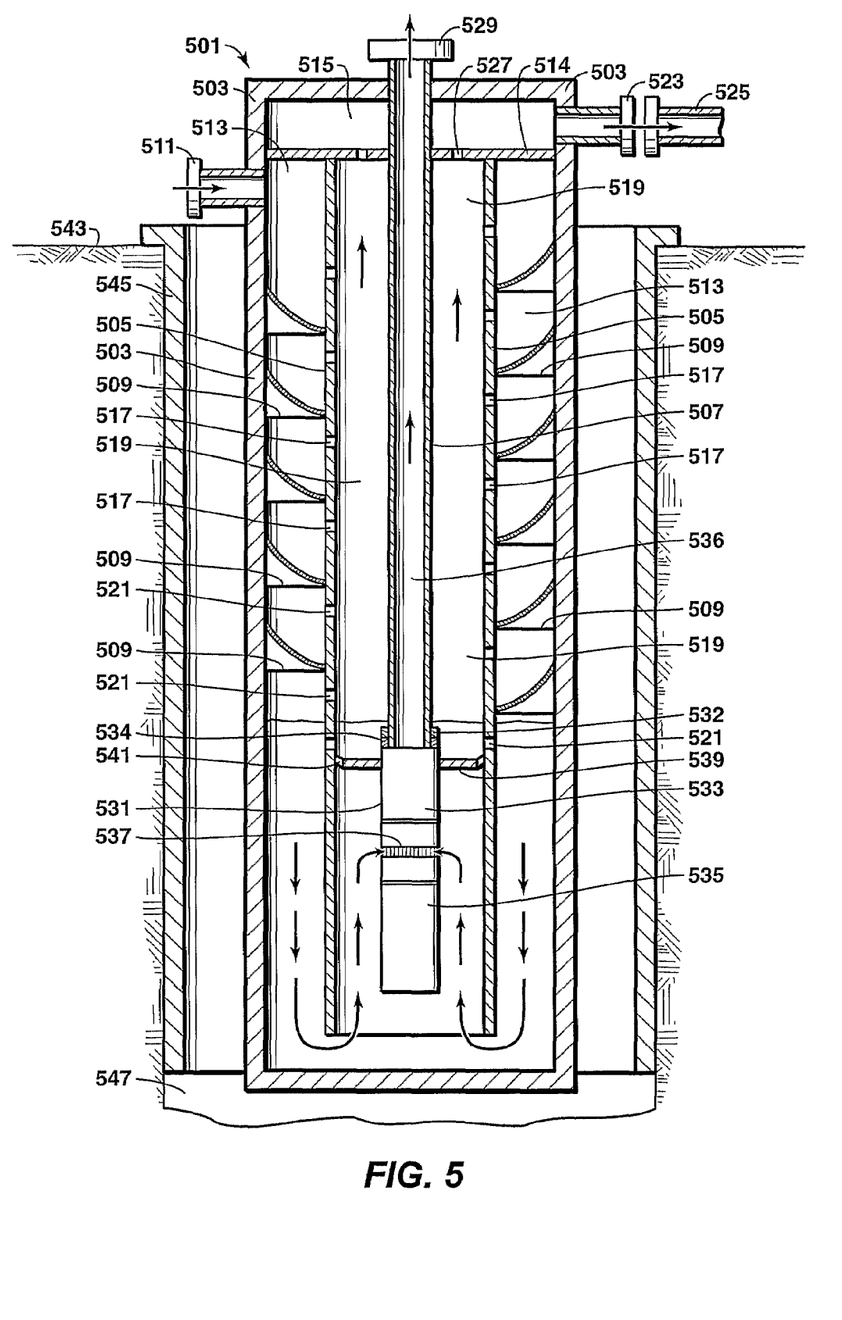
FIG. 5 is a sectional view of one embodiment of a VASPS unit according to the present invention mounted in a subsea location showing an isolation baffle adjacent to the pump assembly.

FIG. 5 shows a sectional view of a preferred embodiment of the present invention. VASPS 501 comprises pressure housing 503 surrounding intermediate casing 505 surrounding inner casing forming liquid discharge tubing 507. Positioned between pressure housing 503 and intermediate casing 505 is helix assembly 509.

Fluid inlet 511 allows fluids to enter pressure housing 503 into fluid annulus 513 which is formed by the inner wall of pressure housing 503 and the outer wall of intermediate casing 505. Plate 514 is located at the top of intermediate casing 505 and isolates separator head-space 515 from fluid annulus 513. Gas passages 527 in plate 514 allow fluid (primarily gas) communication between gas annulus 519 and separator head-space 515. Gas passages 517 allow for fluid (primarily gas) communication between fluid annulus 513 and gas annulus 519 which is formed by the inner wall of intermediate casing 505 and the outer wall of liquid discharge tubing 507. Lower passages 521 allow for fluid (primarily liquid) communication between gas annulus 519 and fluid annulus 513 near the lower end of intermediate casing 505. Gas outlet 523 extends through pressure housing 503 to allow fluid (primarily gas) communication between separator head-space 515 and gas outlet flowline 525.

Liquid discharge tubing 507 extends from liquid outlet 529 with liquid discharge passage 536 down through separator head-space 515 to ESP assembly 531 at liquid inlet 532. ESP assembly 531 comprises ESP pump 533, ESP discharge fitting 534, ESP motor 535, and pump inlet 537. Isolation baffle 539 is attached to ESP assembly 531 above ESP intake 537 and contacts the inside wall of intermediate casing 505. Isolation baffle 539 includes flexible outer edge seal 541.

VASPS 501 is shown installed at a subsurface location at or above the mudline of subsea bed 543 and placed in base conduit 545, which is cemented in place in a dummy hole 547.

Figure 6:
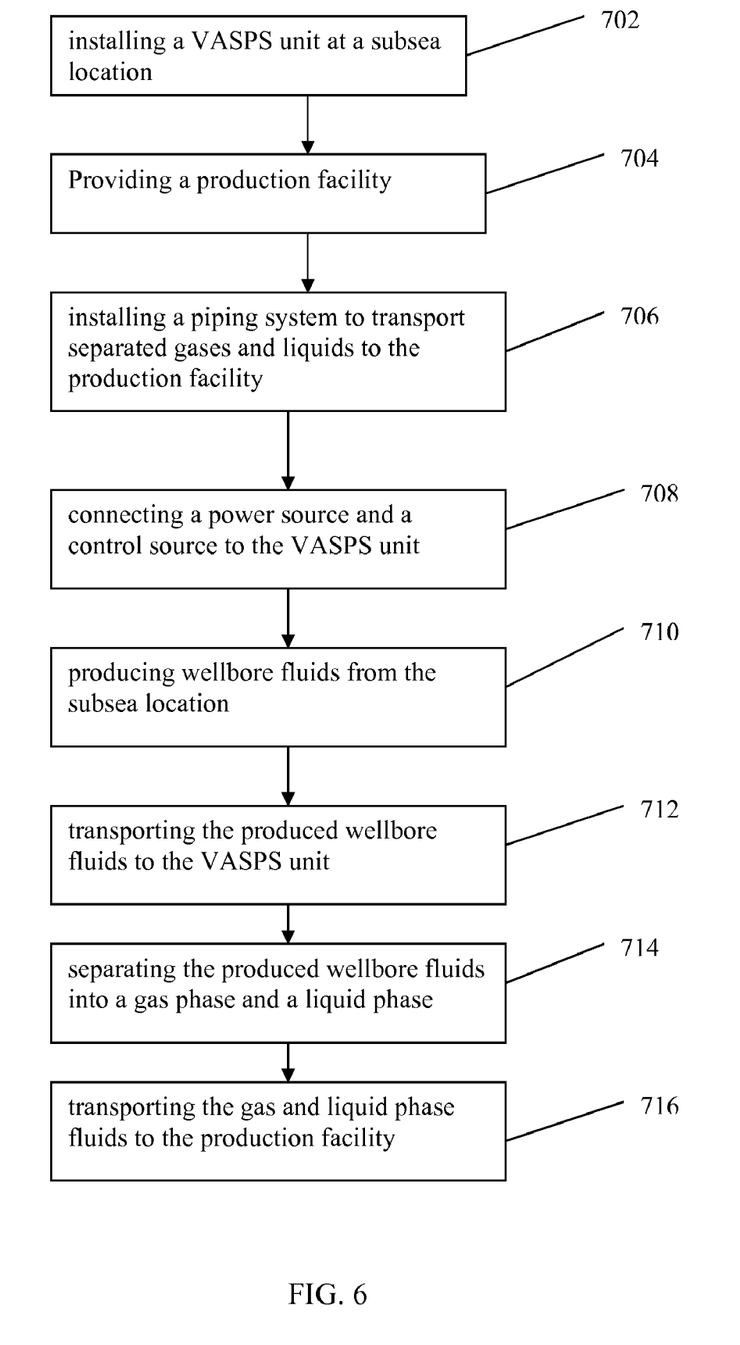
FIG. 6 is a flow chart illustrating a method of producing hydrocarbons from a subsea location according to an embodiment of the present invention.

Referring to FIG. 6, a complete installation and operation of a VASPS of the present invention would include installing a VASPS unit at a subsea location 702; providing a floating or other production vessel, platform, or other subsea or onshore arrangement (collectively referred to as a production facility) 704; installing a piping system to transport separated gases and liquids to the production facility 706; connecting a power source and a control source to the VASPS unit 708; producing wellbore fluids from the subsea location 710; transporting the produced wellbore fluids to the VASPS unit 712; separating the produced wellbore fluids into a gas phase and a liquid phase 714; transporting the gas and liquid phase fluids to the production facility 716.

Having now fully described this invention, it will be appreciated by those skilled in the art that the invention can be performed within a wide range of parameters within what is claimed, without departing from the spirit and scope of the invention.

What is claimed is:

1. A subsea vertical separator capable of separating produced wellbore fluids into a liquid phase and a gas phase, such separator comprising:
   (a) an intermediate casing within an outer casing, forming a first annulus;
   (b) an inner casing within the intermediate casing, forming a second annulus;
   (c) a fluid inlet in communication with the first annulus;
   (d) a gas outlet in communication with the second annulus;
   (e) a liquid passage in the inner casing for conducting separated liquid phase fluids, wherein the liquid passage has a liquid inlet and a liquid outlet;
   (f) a pump assembly comprising a pump positioned within the intermediate casing having (i) a pump intake and (ii) a pump discharge in fluid communication with the liquid inlet of the liquid passage;
   (g) a motor assembly positioned below the pump assembly to drive the pump; and
   (h) an isolation baffle positioned between the inner casing and intermediate casing at or above the pump assembly, whereby separated liquid phase fluids accumulating in the second annulus above the isolation baffle are directed primarily to pass (i) from the second annulus into the first annulus above the isolation baffle, (ii) back into the second annulus at a location below the isolation baffle and at or below the motor assembly, and (iii) into the pump intake above the motor assembly.

2. The separator of claim 1 further comprising a helix assembly positioned in the first annulus between the outer casing and the intermediate casing.

3. The separator of claim 1 further comprising:
   (a) first passages in the intermediate casing above the isolation baffle to allow separated gas phase fluids to pass from the first annulus to the second annulus and to the gas outlet and
   (b) second passages in the intermediate casing at or below the motor to allow separated liquid phase fluids to pass from the first annulus to the second annulus and to the pump intake.

4. The separator of claim 3 wherein the outer casing further comprises a housing with an upper end and a lower end to provide pressure containment for the first annulus, second annulus, and gas passage.

5. The separator of claim 1 further comprising an opening below the motor and below the bottom of the intermediate casing, thereby allowing separated liquid phase fluids to flow (i) from the first annulus, (ii) under the bottom of the intermediate casing to the second annulus, (iii) upward past the motor assembly, and (iv) upward to the pump intake.

6. The separator of claim 1 wherein the isolation baffle is attached to the pump assembly and has a means for flexibly sealing against the intermediate casing.

7. The separator of claim 1 wherein the isolation baffle is attached to the inner casing above the pump assembly and has a means for flexibly sealing against the intermediate casing.

8. The separator of claim 1 wherein the isolation baffle is attached to the pump assembly and a landing ring is attached to the intermediate casing whereby the landing ring is capable of receiving the isolation baffle and providing a substantial fluid seal against the intermediate casing.

9. The separator of claim 8 further comprising a landing guide wherein the landing guide is attached to the pump assembly and is capable of guiding the pump assembly through the landing ring.

10. The separator of claim 1 wherein the isolation baffle is attached to the inner casing and a landing ring is attached to the intermediate casing whereby the landing ring is capable of receiving the isolation baffle and providing a fluid seal against the intermediate casing.

11. The separator of claim 10 further comprising a landing guide wherein the landing guide is attached to the pump assembly and is capable of guiding the pump assembly through the landing ring.

12. The separator of claim 8 wherein the landing ring comprises a cylindrical bushing.

13. The separator of claim 10 wherein the landing ring comprises a cylindrical bushing.

14. A subsea vertical separator capable of separating produced wellbore fluids into a liquid phase and a gas phase, such separator comprising:
   (a) an intermediate casing within an outer casing, forming a first annulus;
   (b) a helix assembly positioned in the first annulus between the outer casing and the intermediate casing;
   (c) an inner casing within the intermediate casing, forming a second annulus;
   (d) a fluid inlet in communication with the first annulus;
   (e) a gas outlet in communication with the second annulus;
   (f) a liquid passage in the inner casing for conducting separated liquid phase fluids, wherein the liquid passage has a liquid inlet and a liquid outlet;
   (g) a pump assembly comprising a pump positioned within the intermediate casing having (i) a pump intake and (ii) a pump discharge in fluid communication with the liquid inlet of the liquid passage;
   (h) a motor assembly positioned below the pump assembly to drive the pump;
   (i) an isolation baffle positioned between the inner casing and intermediate casing at or above the pump assembly, whereby separated liquid phase fluids accumulating in the second annulus above the isolation baffle are directed primarily to pass (i) from the second annulus into the first annulus above the isolation baffle, (ii) back into the second annulus at a location below the isolation baffle and at or below the motor assembly, (iii) into the pump intake above the motor assembly, (iv) through the pump, (v) through the liquid inlet of the liquid passage, (vi) through the liquid passage, and (vii) finally through the liquid outlet of the liquid passage;
   (j) first passages in the intermediate casing above the isolation baffle to allow separated gas phase fluids to pass from the first annulus to the second annulus and to the gas outlet; and
   (k) second passages in the intermediate casing at or below the motor to allow separated liquid phase fluids to pass from the first annulus to the second annulus and to the pump intake.

15. The separator of claim 14 wherein the isolation baffle is attached to the pump assembly and has a means for flexibly sealing against the intermediate casing.

16. The separator of claim 14 wherein the isolation baffle is attached to the inner casing above the pump assembly and has a means for flexibly sealing against the intermediate casing.

17. The separator of claim 14 wherein the isolation baffle is attached to the pump assembly and a landing ring is attached to the intermediate casing whereby the landing ring is capable of receiving the isolation baffle and providing a substantial fluid seal against the intermediate casing.

18. The separator of claim 17 further comprising a landing guide wherein the landing guide is attached to the pump assembly and is capable of guiding the pump assembly through the landing ring.

19. The separator of claim 17 wherein the isolation baffle is attached to the inner casing and a landing ring is attached to the intermediate casing whereby the landing ring is capable of receiving the isolation baffle and providing a fluid seal against the intermediate casing.

20. The separator of claim 17 wherein the landing ring comprises a cylindrical bushing.

21. The separator of claim 19 wherein the landing ring comprises a cylindrical bushing.

22. A method for producing hydrocarbons from a subsea location comprising:
   (a) providing a production facility;
   (b) installing a subsea vertical separator capable of separating produced wellbore fluids into a liquid phase and a gas phase, such separator comprising:
      (i) an intermediate casing within an outer casing, forming a first annulus;
      (ii) an inner casing within the intermediate casing, forming a second annulus;
      (iii) a fluid inlet in communication with the first annulus;
      (iv) a gas outlet in communication with the second annulus;
      (v) a liquid passage in the inner casing for conducting separated liquid phase fluids, wherein the liquid passage has a liquid inlet and a liquid outlet;
      (vi) a pump assembly comprising a pump positioned within the intermediate casing having (a) a pump intake and (b) a pump discharge in fluid communication with the liquid inlet of the liquid passage;
      (vii) a motor assembly positioned below the pump assembly to drive the pump; and
      (viii) an isolation baffle positioned between the inner casing and intermediate casing at or above the pump assembly, whereby separated liquid phase fluids accumulating in the second annulus above the isolation baffle are directed primarily to pass (a) from the second annulus into the first annulus above the isolation baffle, (b) back into the second annulus at a location below the isolation baffle and at or below the motor assembly, and (c) into the pump intake above the motor assembly;
   (c) installing a piping system to transport separated gas to the production facility;
   (d) installing a piping system to transport separated liquids to the production facility;
   (e) connecting a power source and a control source to the motor assembly;
   (f) producing wellbore fluids from the subsea location;
   (g) transporting the produced wellbore fluids to the separator fluid inlet;
   (h) separating the produced wellbore fluids into a gas phase and a liquid phase;
   (i) transporting the gas phase fluids to the production facility; and
   (j) transporting the liquid phase fluids to the production facility.

23. The method of claim 22 wherein the subsea vertical separator further comprises an opening below the motor assembly and below the bottom of the intermediate casing, thereby allowing separated liquid phase fluids to flow (i) from the first annulus, (ii) under the bottom of the intermediate casing to the second annulus, (ii) upwardly past the motor assembly, and (iii) upwardly to the pump assembly suction fitting.

* * * * *